US012072956B2

(12) United States Patent
Nussbaum et al.

(10) Patent No.: US 12,072,956 B2
(45) Date of Patent: Aug. 27, 2024

(54) SIMILARITY TREEING FOR CLUSTERING DATA POINTS

(71) Applicant: AtomRain LLC, Wooster, OH (US)

(72) Inventors: Benjamin Nussbaum, Orrville, OH (US); Bradley Nussbaum, Wooster, OH (US); James Soliman, Garden Grove, CA (US); Alexander Iudice, Valley City, OH (US); Harry Dunham, Lakewood, OH (US); Nicole Powell, Wooster, OH (US)

(73) Assignee: ATOMRAIN LLC, Wooster, OH (US)

( * ) Notice: Subject to any disclaimer, the term of this patent is extended or adjusted under 35 U.S.C. 154(b) by 68 days.

(21) Appl. No.: 17/819,455

(22) Filed: Aug. 12, 2022

(65) Prior Publication Data

US 2024/0054186 A1 Feb. 15, 2024

(51) Int. Cl.
*G06F 7/02* (2006.01)
*G06F 16/00* (2019.01)
*G06F 16/28* (2019.01)
*G06F 18/22* (2023.01)
*G06F 18/23* (2023.01)

(52) U.S. Cl.
CPC ............ *G06F 18/23* (2023.01); *G06F 16/285* (2019.01); *G06F 18/22* (2023.01)

(58) Field of Classification Search
CPC ......... G06F 18/23; G06F 16/285; G06F 18/22
See application file for complete search history.

(56) References Cited

U.S. PATENT DOCUMENTS

| 2009/0287668 A1* | 11/2009 | Evans ................... G06F 16/355 |
| | | 707/E17.046 |
| 2020/0285889 A1* | 9/2020 | Abdi Taghi Abad .... G06N 7/01 |
| 2020/0311384 A1* | 10/2020 | Thompson ............ G06T 7/0012 |

OTHER PUBLICATIONS

Bayer, R. et al, "Organization and Maintenance of Large Ordered Indices," Mathematical and Information Sciences Report No. 20, Boeing Scientific Research Laboratories, pp. 107-141, Jul. 1970. (Year: 1970).*

(Continued)

*Primary Examiner* — Bruce M Moser
(74) *Attorney, Agent, or Firm* — Emerson, Thomson & Bennett, LLC; John M. Skeriotis (57) ABSTRACT

Provided in this disclosure is a method of organizing data from an unordered, unclustered dataset including data points having attributes. The data points are sorted into neighborhoods each having categories based on the attributes. Similarity clusters are created based on a user-selected similarity cluster scope. The clusters are arranged into a similarity tree organized dataset where the clusters are grouped into a hierarchy of similarity levels. New data points are inserted by determining similarity of their attributes to data points in grouped clusters at the highest levels of the hierarchy, and then comparing to data points in grouped clusters at progressively lower levels until a suitable cluster is determined, whereupon the new data point is then inserted. In this manner, only a selected portion of data points are compared, representing an improvement over previous methods that require comparisons to all the data points in a dataset.

10 Claims, 9 Drawing Sheets

(56) References Cited

OTHER PUBLICATIONS

Dumancic, Sebastijan et al, "An Efficient and Expressive Similarity Measure for Relational Clustering Using Neighborhood Trees," European Conference on Artificial Intelligence, pp. 1674-1675, 2016. (Year: 2016).*

Wang, Ke et al, "Clustering Transactions Using Large Items," International Conference on Information and Knowledge Management, pp. 483-490, Nov. 1999. (Year: 1999).*

* cited by examiner

SIMILARITY TREEING FOR CLUSTERING DATA POINTS

BACKGROUND

A. Technical Field

This invention pertains generally to the field of data processing, and particularly the field of similarity comparison and categorization of data points.

B. Description of Related Art

Clustering is a process of grouping together a set of objects (represented by data points) into clusters based on similarities between the objects in the set. Similarity is determined by the "distance" between the objects, where the distance can represent a measurement of one or more degrees of similarity of any common properties possessed by the objects. Algorithms are employed to measure the distances between the data points to determine the clusters and which of the objects belong in which cluster.

Similarity or distance measures are core components used by distance-based clustering algorithms to group similar data points into the same clusters, while dissimilar or distant data points are placed into different clusters. Clustering methods include: (i) initial similarity cluster creation; and (ii) new data point insertion. It is typical in the art for clustering algorithms to compare each data point to all other data points in the dataset, which does not scale for large datasets.

The typical method of comparing every data point to all other data points in the dataset is extremely computationally expensive. This typical approach for identifying similar items is a quadratic time operation, $O(n^2)$. A clustering algorithm has a "quadratic time complexity" when it needs to perform a linear time operation for each value in the dataset, for example:

```
for x in data:
    for y in data:
        similar(x, y)
```

In a more tangible example, suppose a social media account has 10 followers and one wants to understand which ones are most similar. Existing similarity methods require comparing each of those 10 followers to all the others. This would result in an order of 100 comparisons being performed to create the initial clustering and 10 comparisons to insert a new follower in the cluster for followers which are determined to be most similar. However, the level of complexity and computational expense increases when the number of followers increase to: 100; 1,000; 1,000,000, as follows:

| Followers: | 100 | 1,000 (1K) | 1,000,000 (1M) |
|---|---|---|---|
| Initial Cluster Creation: | 10,000 (10K) | 1,000,000 (1M) | 1,000,000,000,000 (1T) |
| Insertion Comparisons: | 100 | 1,000 (1K) | 1,000,000 (1M) |

Figure 9:
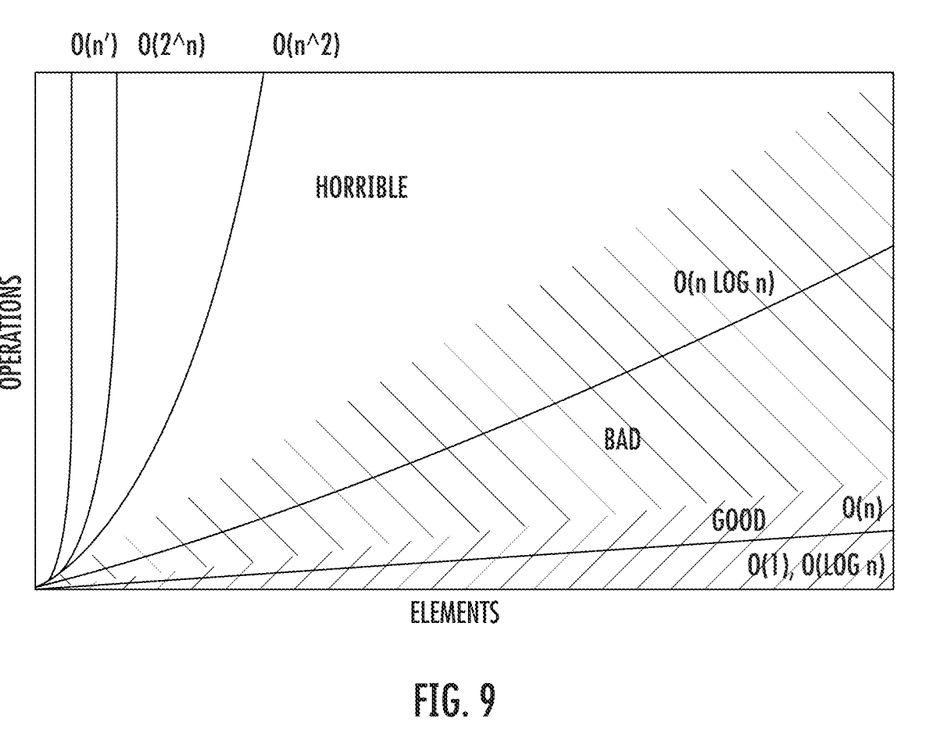
FIG. 9 is a graph depicting the simplification of computational complexity with the present method compared to prior art methods.

If every similarity comparison takes 1 second, with only 1 thousand followers it will require an order of 277.78 hours of computation. And 1 million followers will require an order of 277.78 million hours. Similarly, inserting one new data point into a cluster when the dataset contains 1 M followers will take 277.78 hours of computation. Such a quadratic time complexity operation $O(n^2)$ is depicted in the graph of FIG. 9, which is indicated as being in the "horrible" range.

Such typical algorithms are increasingly important for many industries that rely on understanding the similarity of data points to power a growing variety of capabilities such as recommendations. However, as implied by the aforementioned $O(n^2)$ curve in FIG. 9, these algorithms very quickly become unusable due to the computational expense and time required to perform them at scale. Presently the industry works around this problem by deploying increasingly larger quantities of servers to reduce these times. Otherwise, such work-around solutions tend to just avoid answering questions that require these computations altogether. This is a suboptimal approach since it fails to provide the information desired by the end customers.

Hierarchical clustering algorithms are known in the art which produce a hierarchy that can be navigated to data points. But hierarchical clustering starts with k=N clusters and proceeds by merging the two closest data points into one cluster, obtaining k=N–1 clusters. The process of merging two clusters to obtain k–1 clusters is repeated until we reach the desired number of clusters. This approach does not use the hierarchical structure in any way to reduce the time complexity, thus the current industry accepted time complexity associated with hierarchical clustering is $O(kn^2)$, which is a quadratic time operation that suffers from the computational expense drawbacks indicated hereinabove.

II. SUMMARY

Provided in this disclosure is a method of organizing data, including providing a plurality of data points including a plurality of attributes. A plurality of categories for the data points is created, each based on a respective one of the plurality of attributes of the data points. A plurality of neighborhoods is established for the data points based on the categories. Each neighborhood includes a subset of the plurality of categories. Each of the plurality of data points is inserted into one of the plurality of neighborhoods to produce an unordered, unclustered dataset.

A similarity cluster is created including clustering steps as described in the following steps. A similarity cluster scope is selected including a single selected neighborhood. A representative data point is selected corresponding to the similarity cluster scope from the selected neighborhood. Other data points are selected in the selected neighborhood of the representative data point. A similarity measure is performed between the representative data point and each of the other selected data points, comprising and comparing to determine whether each of the other data points are similar to, and include any of the plurality of attributes of, the representative data point. The similar data points are inserted together with the representative data point to create the similarity cluster corresponding to the similarity measure and the similar data points are removed from the unordered, unclustered dataset. The similarity cluster is inserted into a similarity tree organized dataset having other similarity clusters. The clustering steps are repeated to create one or more additional similarity clusters including additional data points from the unordered, unclustered dataset. The one or more additional similarity clusters are inserted into the similarity tree organized dataset.

The step of repeating the clustering steps can include creating a plurality of additional similarity clusters corresponding to a respective plurality of different similarity cluster scopes. An additional step can include grouping together the similarity clusters in the similarity tree organized dataset according to similarity between the different similarity cluster scopes to produce grouped clusters.

The method can additionally include establishing a hierarchy of similarity levels within the similarity tree organized dataset. The grouped clusters define a first similarity level and also include additional grouping of at least some of the grouped clusters into a second similarity level of grouped clusters representing a similarity distance between the respective grouped clusters. The additional grouping is repeated n number of times to produce a hierarchy of n similarity levels comprising further grouped clusters representing farther similarity distance between respective clusters in the respective similarity levels. A root level includes all the clusters.

Also included is methodology for inserting a new data point into a similarity cluster including the following insertion steps. Similarity is determined between the new data point and data points in a root level grouped cluster of the similarity tree organized dataset. Similarity is determined between the new data point and data points in a first level grouped cluster within the root level of the similarity tree organized dataset. Similarity is continually determined between the new data point and data points in grouped clusters in the hierarchical similarity levels within the first level grouped cluster until a suitable cluster is detected. The new data point is added into the suitable similarity cluster. If the new data point does not fit into an existing cluster, the method continues to determine similarity of the new data point by creating a new suitable similarity cluster and adding the new data point into the new suitable similarity cluster.

In the present method, the data points can represent a type of entity having a primary attribute and a plurality of secondary attributes, such as a person, business, location or any other suitable type of entity. The subset of the plurality of categories of each neighborhood can be different from the subset of the plurality of categories of other respective neighborhoods. Alternatively, the subset of the plurality of categories of each neighborhood can include a hierarchy of subsets of the plurality of categories within each respective neighborhood.

According to an aspect, the present innovative method reduces time and computational expense by reducing the number of calculations.

According to another aspect, the present innovative method eliminates the work-around solutions and avoidance encountered in the prior art and thereby provides the information desired by the end customers.

Other benefits and advantages of this invention will become apparent to those skilled in the art to which it pertains upon reading and understanding of the following detailed specification.

III. BRIEF DESCRIPTION OF THE DRAWINGS

The disclosed method of organizing data may take physical form in certain parts and arrangement of parts, embodiments of which will be described in detail in this specification and illustrated in the accompanying drawings which form a part hereof and wherein.

IV. DETAILED DESCRIPTION

Reference is now made to the drawings wherein the showings are for purposes of illustrating embodiments of the article only and not for purposes of limiting the same, and wherein like reference numerals are understood to refer to like components.

The following definitions refer to terminology used herein:

Data Point: A vector of numerical values.

Dataset: Any combination of data types and values, originating in any format, able to be transformed into any amount of data points.

Directed Acyclic Graph: A graph with each edge directed from one vertex to another, such that following those directions will never form a closed loop.

Directed Tree: A directed acyclic graph whose underlying undirected graph is a tree.

Graph: A mathematical structure consisting of vertices and edges used to model relationships between data points.

Index: A map containing a unique identifier associated with a data point and a set of unique identifiers associated with other data points considered to be neighboring/related/connected to that data point.

Indexed Data Points: Groupings of data points organized into indexes based on bounded dimensions input as the desired dimensions and bounds for distance between the dimensions.

Level (of a tree): Each step from top to bottom of a tree.

Neighborhood: A set of data points connected by one or more paths with a bounded length.

O( ): Big O notation characterizes functions according to their growth rates. The letter O is used because the growth rate of a function is also referred to as the order of the function. Herein when this notation is used it should be understood as the standard mathematical use, read "order of".

Path: A finite or infinite sequence of edges which connect a sequence of vertices.

Representative Data Point: A vector of numerical values, being of the same kind and form, that are representative of the data points within the similarity cluster it represents where the calculation of what representative means is an input based on the configuration and application of the similarity tree.

Selected Similarity Measure: Any algorithm/process/computation used to determine the similarity of two data points and/or representative data points.

Similarity Cluster: A set of data points determined to be similar based on the selected similarity measure.

Similarity Tree: A directed tree where each vertex is a representative data point that connects to other representative data points or data points enabling log(n) movement through the total set of similarity clusters with vectors closer to a root being further apart from each other.

Similarity Tree Organized: Each data point is included in a similarity cluster that is part of a similarity tree.

Tree: An undirected graph in which any two vertices are connected by exactly one path.

Unordered Unclustered: Unorganized and not in a similarity cluster.

The present invention relates to a novel method of "similarity treeing" for computing the similarity of data points. This methodology allows the similarity of all data points in a dataset to be computed initially and maintained over time as new data points are added to appropriate similarity clusters, and while operating with a quasi-linear time complexity O(n log n) for initial similarity cluster creation and with a logarithmic time complexity O(log n) when inserting a new data point into a cluster.

An algorithm has a "quasi-linear time complexity" when each operation in the input data has a logarithmic time complexity. For example: for each value in the data input, a linear time O(n) operation uses similarity treeing operating on the O(log n) to compare against the full dataset. An algorithm has a logarithmic time complexity if doubling the number of data elements does not result in doubling the amount of processing, but rather, the amount of processing to be done increases 'x' times when we increase the dataset 2× times. This generally occurs when the result is computed by iterating over only some of the elements in the dataset rather than iterating through each of the elements. The relative costs of quasi-linear time complexity O(n log n) and logarithmic time complexity O(log n) are depicted in FIG. 9, where the initial similarity cluster creation performance O(n log n) is more towards "good" and greatly improved over the prior art quadratic time complexity $O(n^2)$, and the new data point insertion performance O(log n) is beyond "good" and greatly improved over the prior art linear time complexity, both as discussed hereinabove.

The impact of the present similarity treeing methodology is now given using the aforementioned example of the social media account with 10 followers to compare similarity. The present similarity treeing compares each of those 10 followers to log(10) followers, which would result in 10 comparisons being performed to create an initial cluster and 1 comparison to insert a new follower in the most similar cluster of followers. A common logarithm is used for these calculations instead of the binary logarithm because it is expected that the clusters will have closer to ten elements than two. Table 1 indicates scaling for progressively larger numbers of followers:

TABLE 1

| Followers: | 100 | 1,000 | 1,000,000 |
|---|---|---|---|
| Initial Cluster Creation: | 200 | 3,000 | 6,000,000 |
| Insertion Comparisons: | 20 | 30 | 60 |

The present similarity treeing methodology benefits (i) initial similarity cluster creation, (ii) new data point insertion and (iii) similarity cluster refresh/rebalancing. The methodology disclosed herewith illustrates how similarity clustering can be performed in quasi-linear time for initial similarity cluster creation and logarithmic time for new data point insertion. The time complexity summary depicted in Table 2 below displays a comparison for both creation and insertion. It should be noted that exponentially fewer comparisons are required by similarity treeing than by the prior art approach currently employed in the industry. As a result, the methodology of the present invention improves the functioning of a computer in that it reduces computational complexity by orders of magnitude compared to the time it would take for a standard, general purpose computer to cluster and compare data. The present methodology thus represents a significant improvement over the known, existing prior art processing schemes currently processed using general purpose computers. Therefore, the methodology of the present invention adds significantly more to the computer arts than available using the standard, commonplace, presently available general purpose computers.

TABLE 2

Time Complexity Comparison Between Prior Art Approach and Similarity Treeing

| | Initial Cluster Creation | | New Data Point Insertion | |
|---|---|---|---|---|
| Followers | Prior Art | Treeing | Prior Art | Treeing |
| 100 | 10,000 | 2,000 | 100 | 20 |
| 1,000 | 1,000,000 | 30,000 | 1,000 | 30 |
| 1,000,000 | 1,000,000,000,000 | 60,000,000 | 1,000,000 | 60 |

Figure 1:
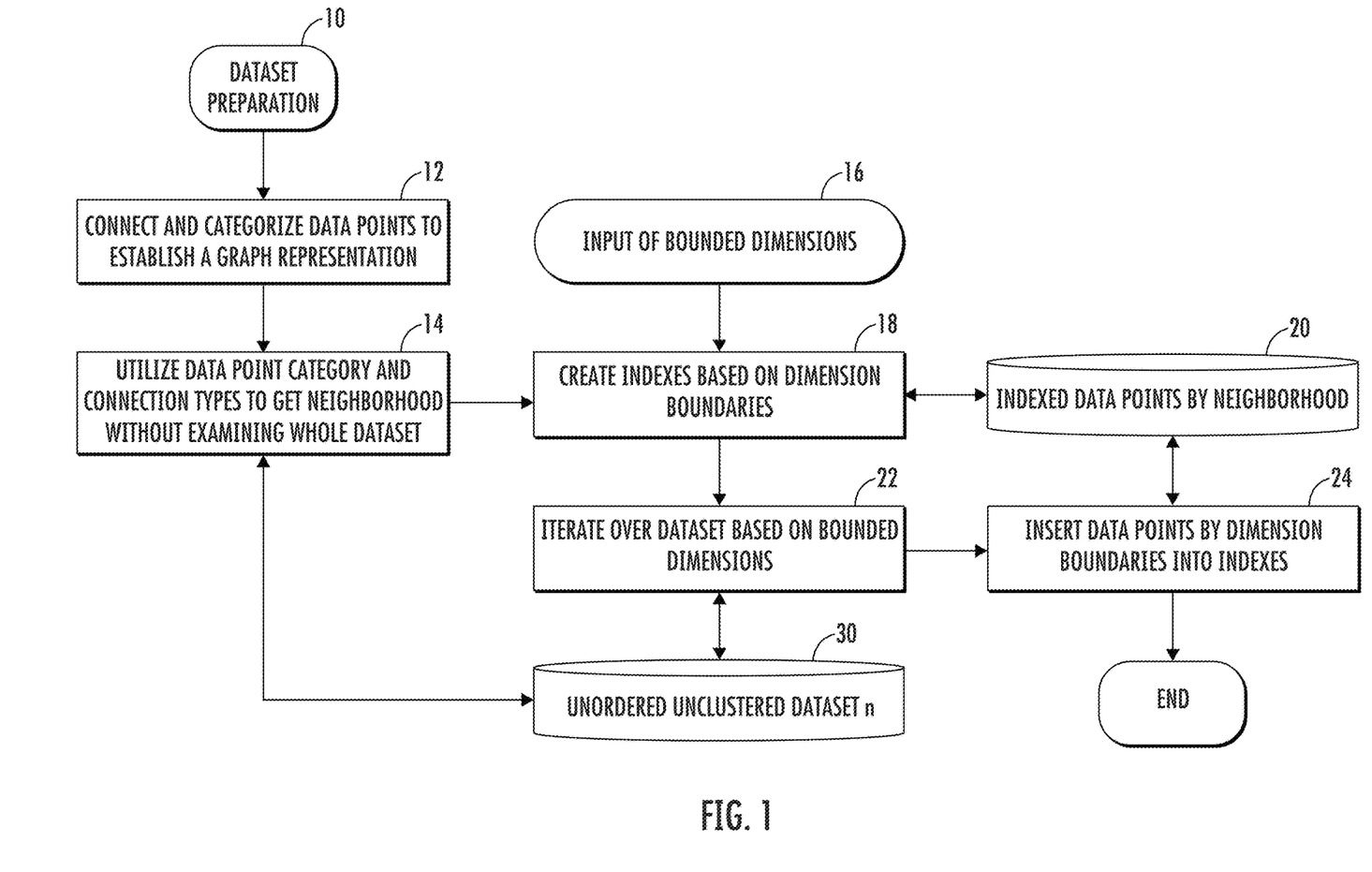
FIG. 1 is a flow chart depicting steps in dataset preparation in accordance with the present method.

With reference to FIG. 1, the present method includes steps of dataset preparation 10, beginning with providing a plurality of data points including a plurality of attributes. An initial step 12 includes connecting and categorizing data points to establish a graph representation which entails creating a plurality of categories for the data points each based on a respective one of the plurality of attributes of the data points. A step 14 is performed of utilizing data point category and connection types to get a neighborhood without examining the whole dataset. This step 14 includes establishing a plurality of neighborhoods for the data points based on the categories, such that each neighborhood comprises a subset of the plurality of categories. The term "connection types" refers to the linkages between two data elements. Just like similar data elements can be grouped into different categories such as Person or Organization, linkages can also be grouped by type such as WORKS_FOR or LEADER_OF.

With further reference to FIG. 1, a step 16 is performed of inputting of bounded dimensions, followed by a step 18 of creating indexes based on the dimension boundaries and then a step 20 resulting in indexed data points by neighborhood. The bounded dimensions limit the number of consecutive links with the same connection type out from the starting point that is relevant to consider. For example, the bounded dimensions could follow the WORKS_FOR linkage between data elements 5 levels out from the starting point. By doing this for every link, it establishes a boundary. All these boundaries followed out to that dimension and those data elements become the neighborhood. A step 22 follows of iterating over the dataset based on the bounded dimensions, resulting in a step 24 of inserting data points by dimension boundaries into the indexes. These aforementioned steps result in inserting each of the plurality of data points into one of the plurality of neighborhoods to produce an unordered, unclustered dataset 30.

With ongoing reference to the method flow depicted in FIG. 1, the data points preferably represent a type of entity having a primary attribute and a plurality of secondary attributes. The primary attributes can be or represent a person, a business, a location, etc., and the secondary attributes can be any properties that can further characterize the primary attribute. They could also both be properties of varying importance. For example, for "Person," a primary attribute could be a name and a secondary attribute could be age, location (street address), etc. In the method of FIG. 1, each neighborhood preferably has a subset of the plurality of categories which is different from the subset of the plurality of categories of other respective neighborhoods. Alternatively, the subset of the plurality of categories of each neighborhood can include a hierarchy of subsets of the plurality of categories within each respective neighborhood.

Figure 2:
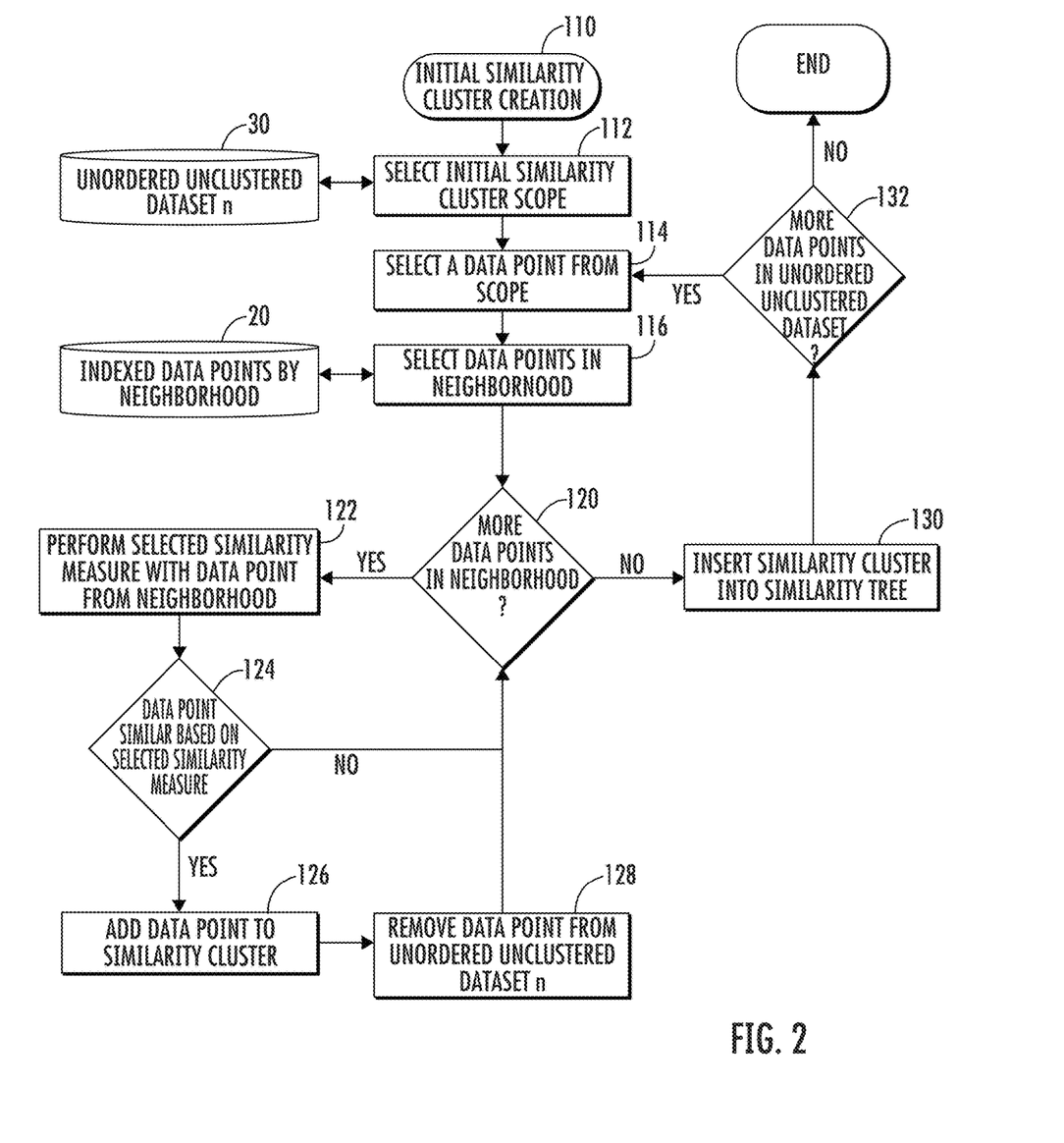
FIG. 2 is a flow chart depicting steps in creating a similarity tree in accordance with the present method.

With reference to FIG. 2, the present method includes steps 110 of INITIAL SIMILARITY CLUSTER CREATION, beginning with a step 112 of selecting an initial similarity cluster scope including a single selected neighborhood. A step 114 follows of selecting a representative data point corresponding to the similarity cluster scope from the selected neighborhood. This is followed by a step 116 of selecting other data points in the selected neighborhood of the representative data point from the indexed data points by neighborhood 20. This leads to a decision block 120 to determine whether there are more data points in the neighborhood.

With continued reference to FIG. 2, a YES at decision block 120 results in a step 122 of performing a selected similarity measure on another data point from the neighborhood, which includes comparing to determine whether the other data point is similar to a data point that includes any of the plurality of attributes of the representative data point. A decision block 124 determines whether the other data point is similar based on the selected similarity measure. If YES, a step 126 is performed of inserting the similar data point together with the representative data point to create the similarity cluster corresponding to the similarity measure, after which a step 128 is performed of removing the similar data point from the unordered, unclustered dataset 20.

With ongoing reference to FIG. 2, after step 128, and also if NO at the decision block 124, flow returns to the decision block 120 to determine if there are more data points in the neighborhood. If YES, steps 122, 124, and 126 are repeated until a NO result is obtained at step 120, indicating that all the data points in the neighborhood have been compared. Upon a NO result at step 120, a step 130 is performed of inserting the similarity cluster into a similarity tree organized dataset having other similarity clusters. This leads to a decision block step 132 for determining whether there are any more data points in the unordered, unclustered dataset outside of the neighborhood. If YES, the flow returns to step 114 and repeats the clustering steps 114, 116, 120, 122, 124, 126, 128, and 130 to create another additional similarity cluster including additional data points from the unordered, unclustered dataset, such that the additional similarity cluster is inserted into the similarity tree organized dataset. This process loops until a NO result is obtained at decision block 132, when the process ends.

Figure 3:
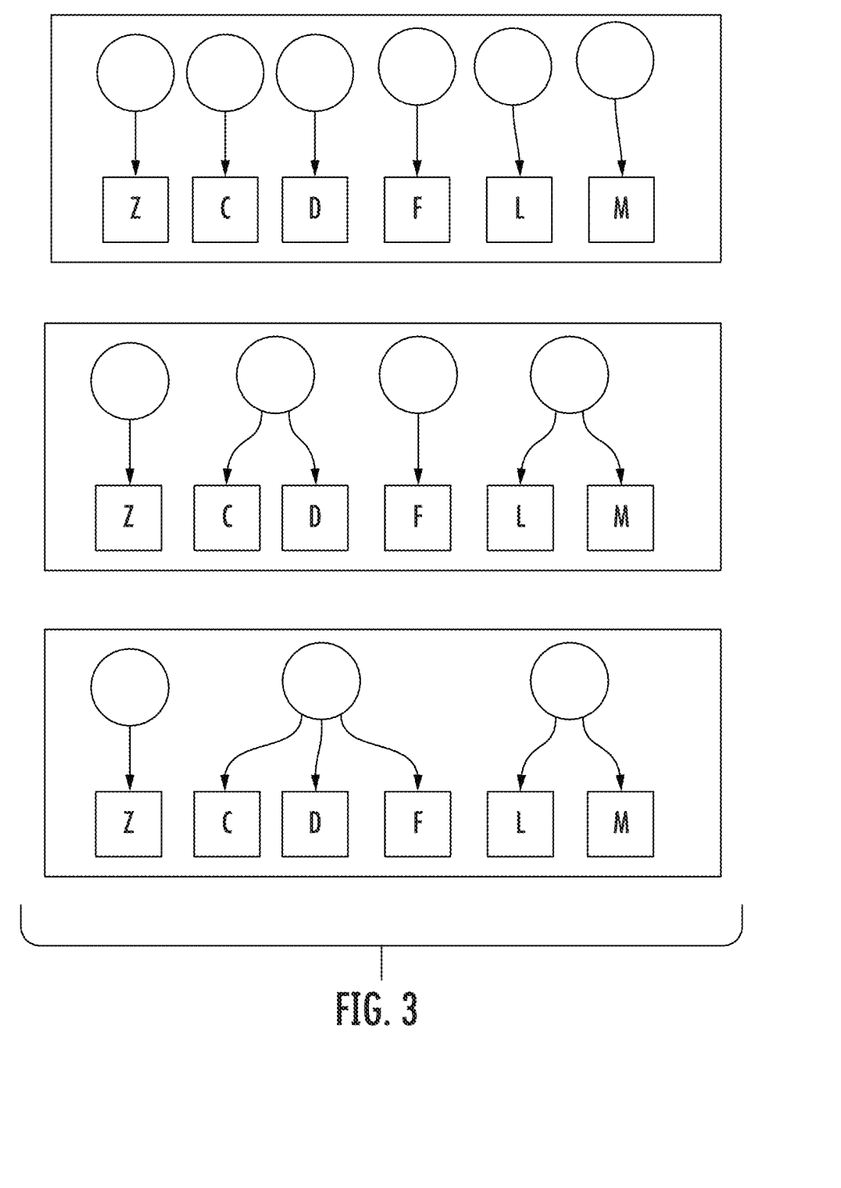
FIG. 3 depicts a grouping of clusters in order to create a hierarchy of distances between clusters at different levels within a similarity tree in accordance with the present method.
Figure 4:
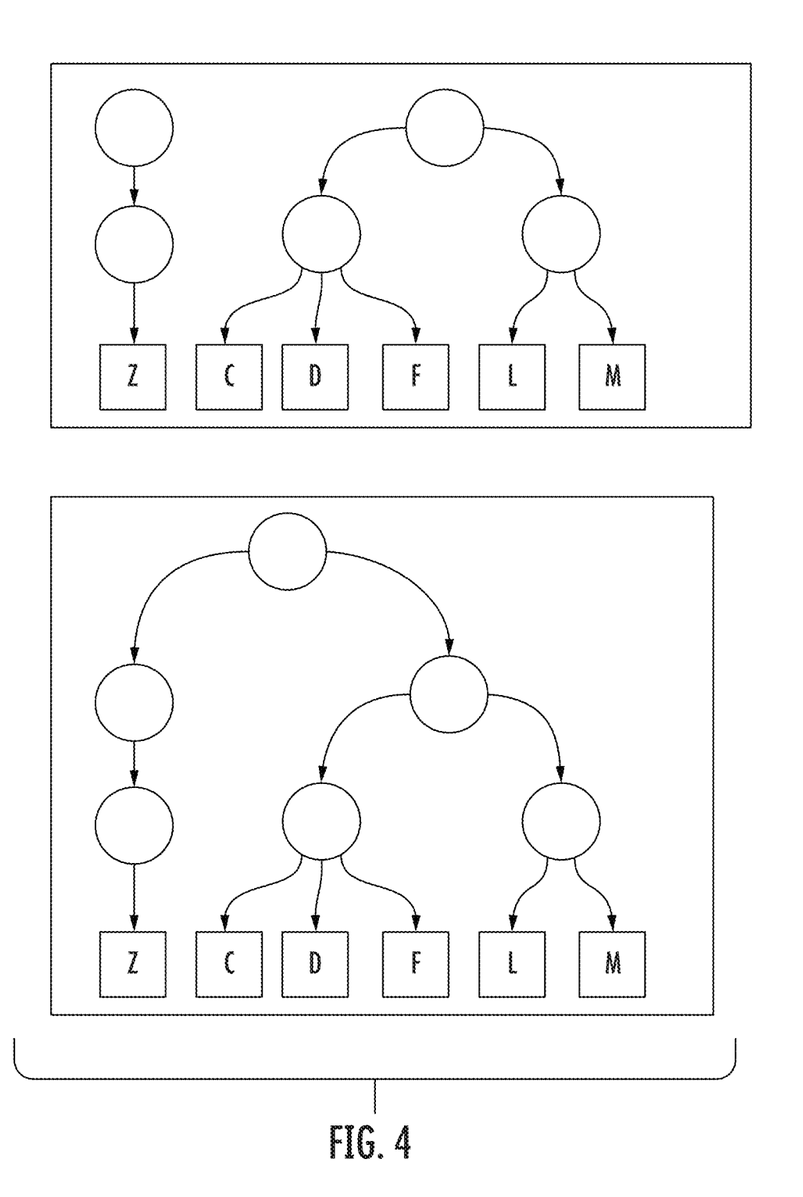
FIG. 4 further depicts the grouping of clusters in order to create the hierarchy of distances between clusters at different levels within the similarity tree in accordance with the present method.

As generally indicated in FIGS. 3 and 4, the repeating of the clustering steps 114, 116, 120, 122, 124, 126, 128, and 130 preferably includes creating a plurality of additional similarity clusters corresponding to a respective plurality of different similarity cluster scopes. The method additionally includes grouping together the similarity clusters in the similarity tree organized dataset according to similarity between the different similarity cluster scopes to produce grouped clusters. The method thus establishes a hierarchy of similarity levels within the similarity tree organized dataset, such that the grouped clusters define a first similarity level and additionally grouping at least some of the grouped clusters into a second similarity level of grouped clusters representing a "similarity distance" between the respective grouped clusters.

For example, as shown in FIG. 3, the clusters indicated as Z, C, D, F, L, and M represent the first step of the initial similarity clustering process. On the second similarity step, clusters C and D are determined to be "close" to each other in similarity distance, as are clusters L and M. Clusters C, D, and F are found to be close on a third similarity step. This process of additional grouping is repeated n number of times to produce a hierarchy of n similarity levels including further grouped clusters representing farther similarity distance between respective clusters in the respective similarity levels. For example, as shown in FIG. 4, a fourth level of "farther distance" can be established which includes cluster C, D, F and cluster L, M. A root level is then established representing "farthest distance" and including all the clusters, cluster C, D, F and cluster L, M, and cluster Z.

Once this cluster is obtained, all the data points can be removed from the scope and the representative data point for this cluster can be inserted into the similarity tree. This process continues for the remaining data points until all data points belong to a cluster that has been inserted into the similarity tree. Depending on the data and similarity comparison parameters used, it is possible a data point could not be similar to any existing representative data points which would result in the creation of a new representative data point for a cluster where the data point is the only one in that cluster. The depth, number of levels, from the root to leaf data points at the bottom is determined by taking the log of the number of data points in the starting scope. This requires a new level to be added each time the number of data points crosses another order of magnitude (i.e. 1K, 10K, 100K, 1 M, etc.).

The aforementioned INITIAL SIMILARITY CLUSTER CREATION to create the similarity tree thus represents an improvement over the prior art method of processing an unordered dataset without similarity treeing, which requires comparing a candidate data point to each other data point in the dataset one at a time, a process that requires $O(n^2)$ comparisons for an entire dataset. Using the present methodology to produce a similarity tree, we select an initial data point and then limit the scope to only the data points in the neighborhood of the initial data point. Comparisons are then executed (using the same calculation as that for when a single data point is added) to determine which data points are similar enough to cluster together. Once this cluster is created, all these data points are then removed from our scope and the process continues for the remaining data points until all the data points belong to a cluster (it is possible that a single data point may be the only one in its cluster, depending on the data and parameters used).

In the preferred embodiment, a neighborhood can include around log(n) data points, so that the present algorithm performs on the order of n log(n) calculations to create the clusters in the similarity tree. But this cluster refresh rarely needs to run (usually only when the size of the dataset grows by an order of magnitude), and it saves more than enough computation for each new data point to justify it running with that frequency.

For initial cluster creation (or refresh), the present method of similarity treeing is advantageous in the "sketching" performed before the comparisons during the initial similarity cluster creation. As an example, for natural language processing (NLP), such sketching could be performed based on the minimum common mentions in a sample text. As a tangible example, for a social media account having 1 M followers, there would be only 60 M (6×10^7) comparisons for the 1 M (1×10^6) data point dataset, thereby representing a major improvement over the 1T (1×10^12) comparisons that would be needed for comparing all the data points to each other without such sketching. Note that 60 M is still on the order of n log(n) because there is a constant scale factor that depends on the average size of the cluster, which in the example above is 10. Consequently, since 1,000,000 log(1,000,000)=6 M, that value multiplied by the scale factor of 10 results in 60 M comparisons. Further, the present similarity tree methodology supports similarity cluster refresh beginning at a target depth and only rebalancing the similarity clusters contained within those branches of the tree, which reduces the time complexity to O(log n) for refresh.

Figure 5:
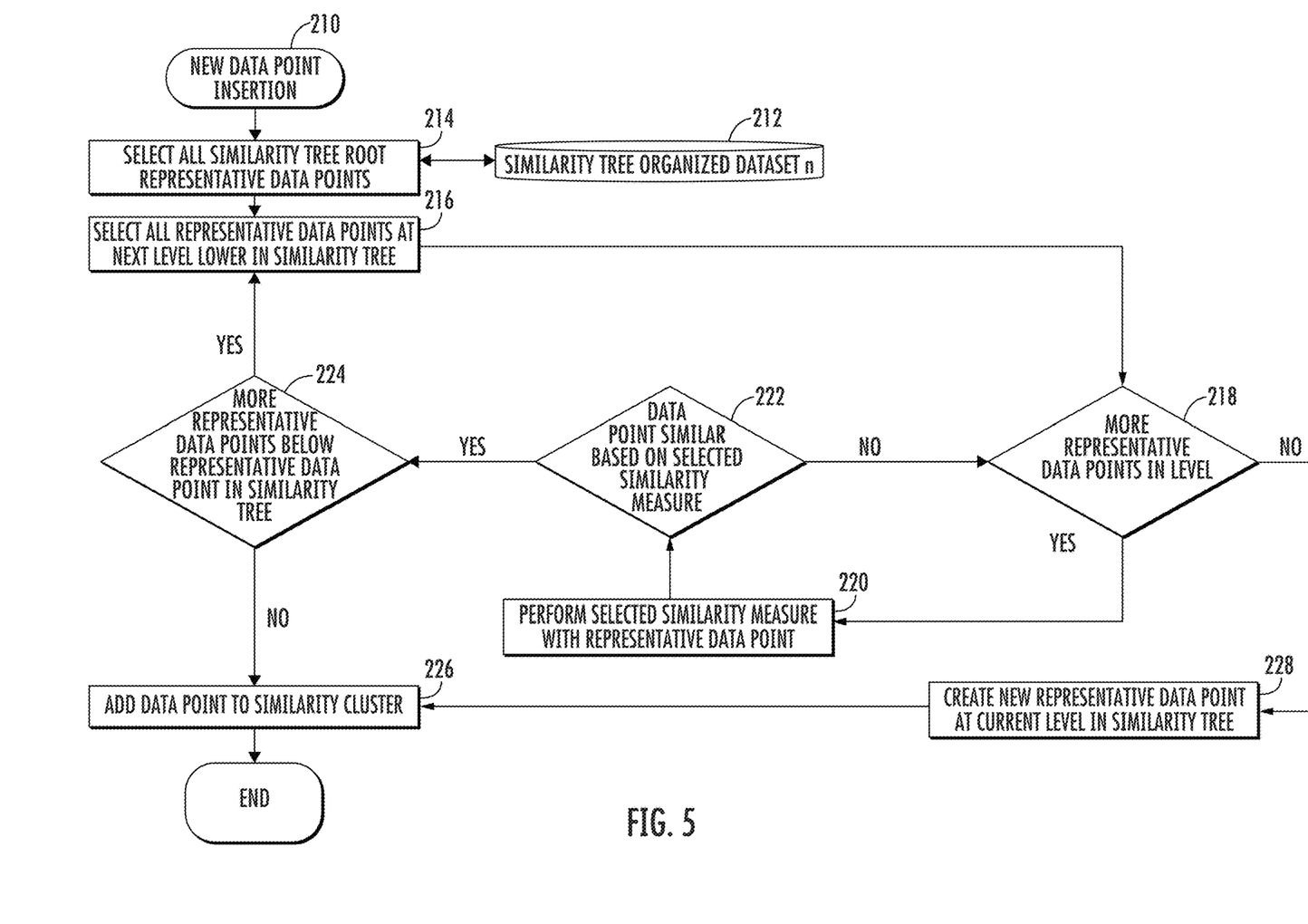
FIG. 5 is a flow chart depicting steps in inserting a new data point into a suitable cluster of the similarity tree in accordance with the present method.
Figure 6:
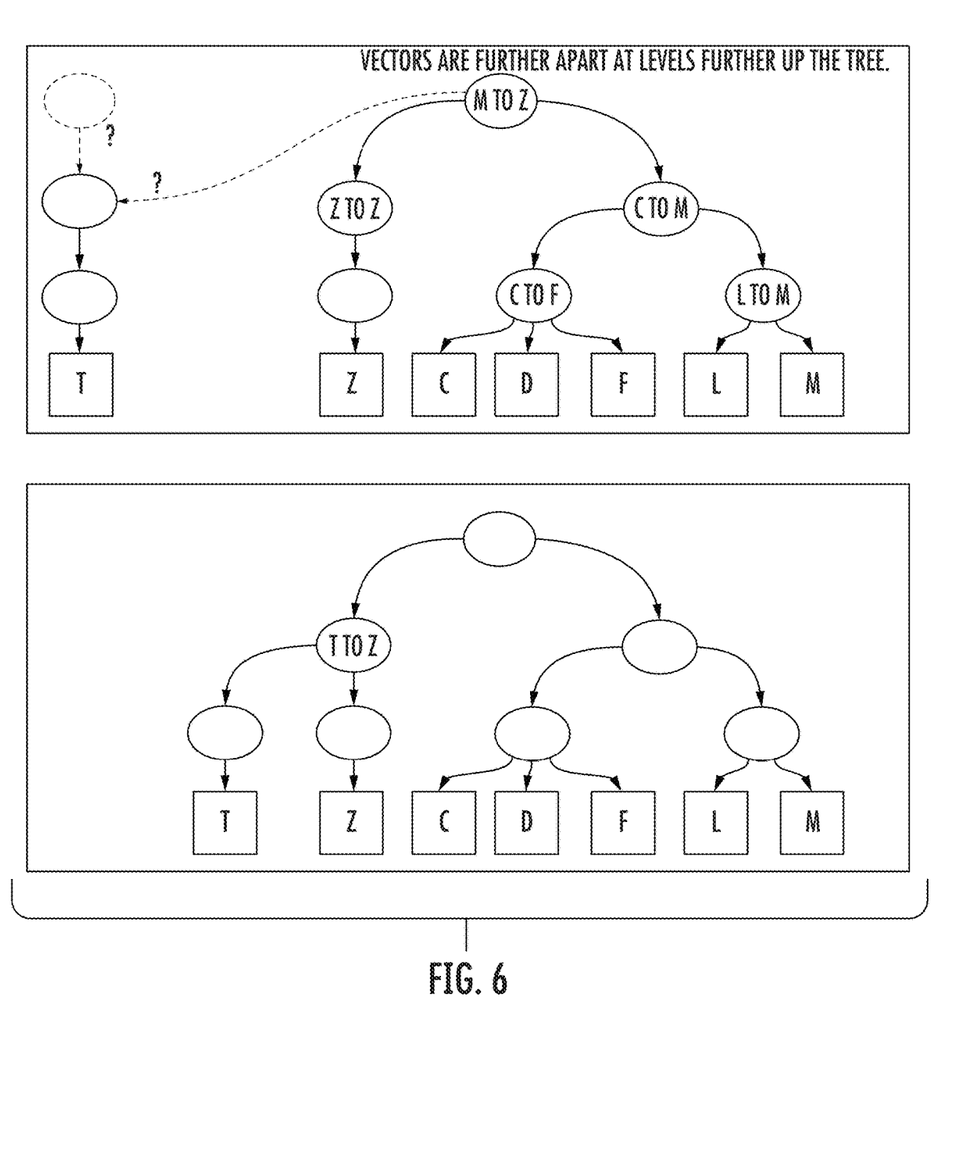
FIG. 6 depicts distances of grouped clusters in order to create the hierarchy of distance between clusters within the similarity tree in accordance with the present method.
Figure 7:
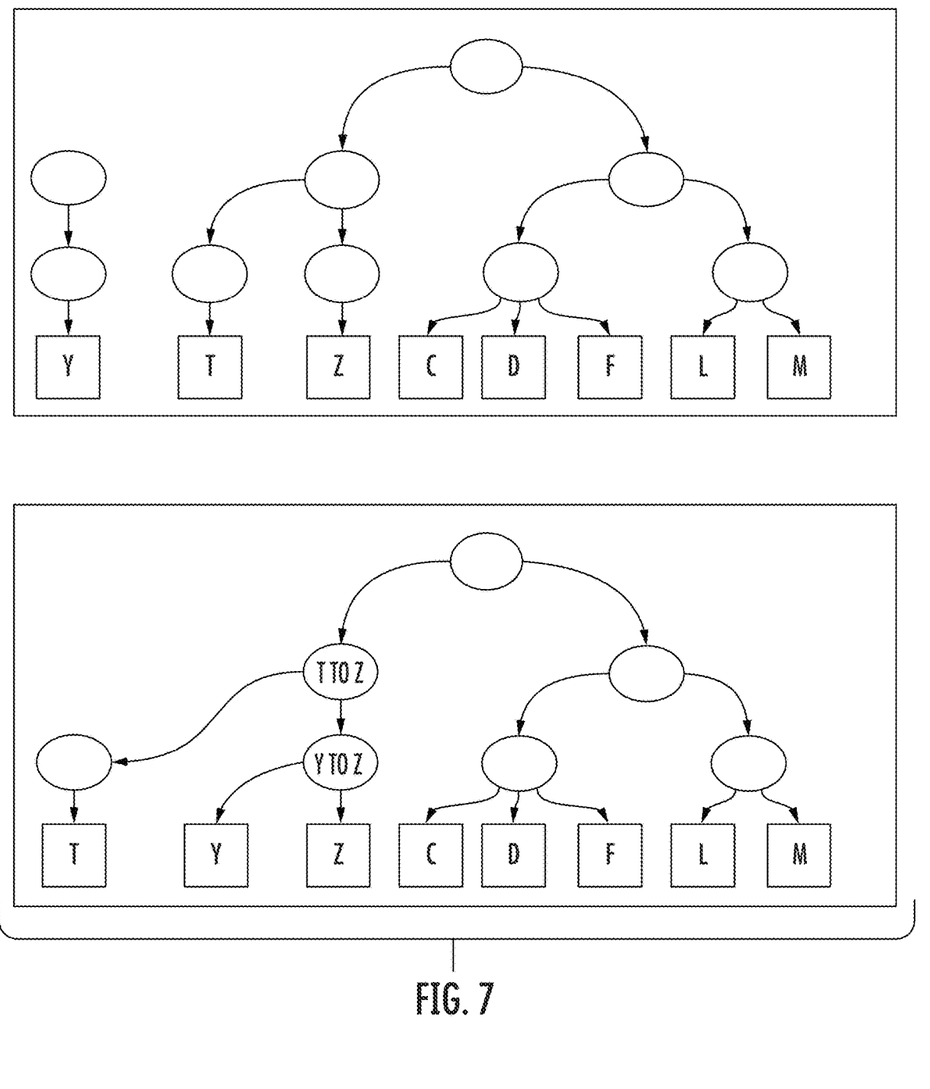
FIG. 7 further depicts distances of grouped clusters in order to create the hierarchy of distance between clusters within the similarity tree in accordance with the present method.

With reference to FIG. 5, the present method also includes steps 210 of NEW DATA POINT INSERTION, in which new data points are inserted into clusters of the similarity tree organized dataset 212 described hereinabove, and which are created in accordance with the method of INITIAL SIMILARITY CLUSTER CREATION shown in FIG. 2 and discussed in detail hereinabove. The method begins with a step 214 of selecting all similarity tree root representative data points, in which representative data points at the root level of the similarity tree are selected for comparison in determining similarity of the new data point to data points in a root level grouped cluster of the similarity tree organized dataset 212. A step 216 follows of selecting all representative data points at the next level lower in the similarity tree, which entails a further comparison of determining similarity of the new data point to the representative data points in a first level grouped cluster within the root level of the similarity tree organized dataset 212.

With further reference to FIG. 5, the method continues at a decision block 218 where it is determined whether there are more representative data points in the level (in this case, the first level). A YES decision at block 218 is followed by a step 220 of performing a selected similarity measure with a representative data point of a cluster at the level (i.e., the first level). A decision block 222 follows for determining whether the data point is similar based on the user-selected similarity measure. A YES decision at block 222 is followed by the decision block 224 where a comparison is made to more representative data points at a level below the representative data point in the similarity tree.

With continuing reference to FIG. 5, a YES decision at block 224 returns the workflow to step 216 where all the representative data points are selected at the next lower level of the similarity tree (in this case, the second level). The flow returns to block 218 and subsequent flow where the clusters at that level (i.e., the second level) are compared to determine if the data point most suitably belongs to a cluster at this level. This process continues again through step 220, blocks 222, 224, and 216, to determine similarity of the new data point to data points in various grouped clusters within the subsequent hierarchical similarity levels until a suitable level is detected. After sufficient looping, a NO decision at block 224 indicates that the suitable cluster at the suitable level is detected, and results in a step 226 of adding the new data point into the suitable similarity cluster.

With ongoing reference to FIG. 5, the method will look for a suitable cluster within a suitable level upon encountering a NO at decision block 222, where the flow loops back to block 218 so that the selected similarity measure is performed with a representative data point of a different cluster at that same level. The process loops again to step 220 and then to block 222 where a series of NO decisions loop back to block 218 until all the clusters at the same level are compared until a suitable cluster is determined. A YES decision with 222 proceeds to block 224 followed by subsequent workflow as described hereinabove. A NO decision at block 218 proceeds to a step 228 of creating a new representative data point at the current level in the similarity tree, further including creating a new suitable similarity cluster. After this, flow proceeds again to step 226 of adding of the new data point into the new suitable similarity cluster. The process ends after the new data point has been inserted.

The aforementioned method of NEW DATA POINT INSERTION enables inserting a plurality of new data points into clusters of the similarity tree organized dataset. The present method enables the introduction of new data points, and a determination of greatest similarity of the new data points. In the prior art methods, adding just a single additional data point requires O(n) new comparisons. Instead, the present method enables creation of a representative data point for groups of data points that have been found to be similar to each other. This enables comparisons with a much smaller layer of representative data points. Once the most similar representative data point has been determined, it is only necessary to compare data points within that representative data point.

In this manner, the present method reduces the comparison size from 100 to 20, an entire order of magnitude. Only O(log n) comparisons is required to find the most similar data points. For a scaled example of 1000 data points in a dataset, each of these data points is a representative data point that represents another cluster of ten. Using the standard industry methods known in the prior art, a tenfold increase in data points would also increase the comparison count tenfold (from 100 to 1000 in this case). But using the similarity treeing of the present methodology, it is necessary to only process an additional layer of representative data points. Thus only 30 comparisons are required instead of 1000. Every multiplied increase in the number of data points can be treated the same way. A million data points simply requires six layers of representative data points, and thus only need 60 comparisons instead of a million.

The present methodology includes additional algorithm benefits. Computing closeness centrality based on the similarity tree provides a benefit in that a score of a data point is simply composed of a weighted sum of all the representative data points in each level below it in the similarity tree. For example, one representative data point can have ten data points in its base level in the similarity tree, and that similarity cluster could have seven representative data points in its depth 1 level, and the depth 1 level might have eight representative data points in its depth 2 level, etc. This data point would be much more central than a data point that has three representative data points in its base level, which has four representative data points in its depth 1 Level, etc., without requiring any additional comparison calculations.

Figure 8:
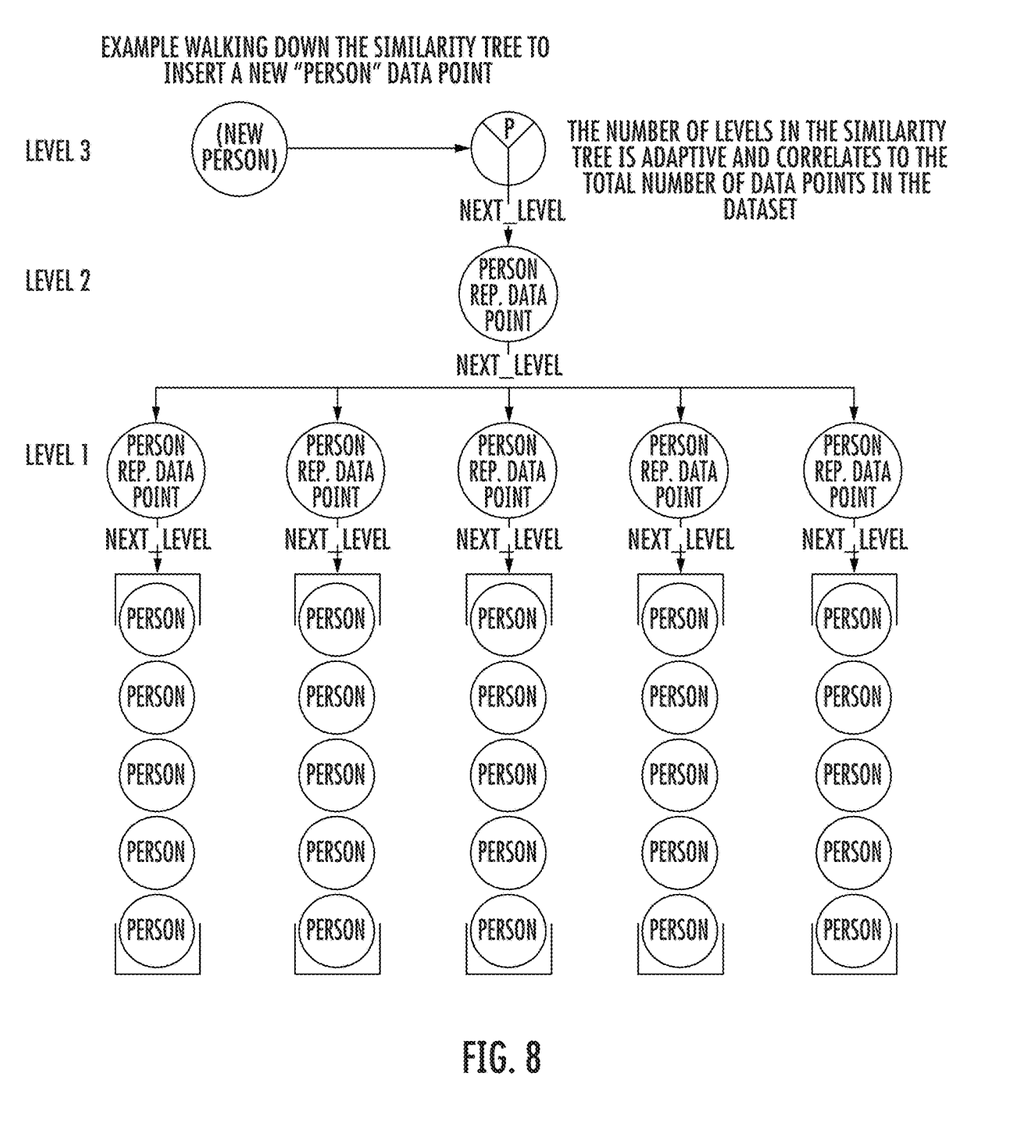
FIG. 8 depicts an example of walking down the hierarchy of the similarity tree to insert a new data point in accordance with the present method.

FIG. 8 is an example with "Person" data points of how the present method reduces the number of comparisons needed when walking down through the similarity tree representative data points to the lowest level compared to starting with all the individual Person data points. However, such results may not be the most relevant compared to a more generalized diagram.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:
What is claimed:

1. A method of organizing data, comprising:
   providing a plurality of data points including a plurality of attributes;
   creating a plurality of categories for the data points each based on a respective one of the plurality of attributes of the data points;
   establishing a plurality of neighborhoods for the data points based on the categories, wherein each neighborhood comprises a subset of the plurality of categories;
   inserting each of the plurality of data points into one of the plurality of neighborhoods to produce an unordered, unclustered dataset;
   creating a similarity cluster comprising clustering steps of:
      selecting a similarity cluster scope comprising a single selected neighborhood;
      selecting a representative data point corresponding to the similarity cluster scope from the selected neighborhood;
      selecting other data points in the selected neighborhood of the representative data point;
      performing a similarity measure on the other data points comprising a step of comparing to determine whether each of the other data points are similar data points that include any of the plurality of attributes of the representative data point;
      inserting the similar data points together with the representative data point to create the similarity cluster corresponding to the similarity measure and removing the similar data points from the unordered, unclustered dataset; and inserting the similarity cluster into a similarity tree organized dataset having other similarity clusters; and
   repeating the clustering steps to create at least one additional similarity cluster including additional data points from the unordered, unclustered dataset until all data points belong to a similarity cluster, wherein at least one additional similarity cluster is inserted into the similarity tree organized dataset.

2. The method of claim 1, wherein the repeating of the clustering steps comprises creating a plurality of additional similarity clusters corresponding to a respective plurality of different similarity cluster scopes.

3. The method of claim 2, further comprising grouping together the similarity clusters in the similarity tree organized dataset according to similarity between the different similarity cluster scopes to produce grouped clusters.

4. The method of claim 3, further comprising establishing a hierarchy of similarity levels within the similarity tree organized dataset, wherein the grouped clusters define a first similarity level and further comprising additionally grouping at least some of the grouped clusters into a second similarity level of grouped clusters representing a similarity distance between the respective grouped clusters.

5. The method of claim 4, wherein the additional grouping is repeated n number of times to produce a hierarchy of n similarity levels comprising further grouped clusters representing farther similarity distance between respective clusters in the respective similarity levels, wherein a root level comprises all the clusters.

6. The method of claim 1, wherein the data points represent a type of entity having a primary attribute and a plurality of secondary attributes.

7. The method of claim 1, wherein the subset of the plurality of categories of each neighborhood is different from the subset of the plurality of categories of other respective neighborhoods.

8. The method of claim 1, wherein the subset of the plurality of categories of each neighborhood comprises a hierarchy of subsets of the plurality of categories within each respective neighborhood.

9. A method of organizing data, comprising:
   providing an unordered, unclustered dataset comprising a plurality of data points having a plurality of attributes, wherein the data points are sorted into a plurality of neighborhoods each comprising a set of categories based on the plurality of attributes;
   creating a similarity cluster comprising clustering steps of:
      selecting a similarity cluster scope comprising a single selected neighborhood;
      selecting a representative data point corresponding to the similarity cluster scope from the selected neighborhood;
      selecting other data points in the selected neighborhood of the representative data point;
      performing a similarity measure on the other data points by comparing each of the other data points to determine if they are similar data points that include any of the plurality of attributes of the representative data point;
      inserting the similar data points together with the representative data point to create the similarity cluster corresponding to the similarity measure and removing the similar data points from the unordered, unclustered dataset; and
      inserting the similarity cluster into a similarity tree organized dataset having other similarity clusters;
   repeating the clustering steps to create a plurality of additional similarity clusters having a respective plurality of different similarity cluster scopes until all data points belong to a similarity cluster, wherein the additional similarity clusters include additional data points from the unordered, unclustered dataset, wherein the at least one additional similarity cluster is inserted into the similarity tree organized dataset;
   grouping together the similarity clusters in the similarity tree organized dataset according to similarity between the different similarity cluster scopes to produce grouped clusters;
   establishing a hierarchy of similarity levels within the similarity tree organized dataset, wherein the grouped clusters define a first similarity level and further comprising additionally grouping at least some of the grouped clusters into a second similarity level of grouped clusters representing a similarity distance between the respective grouped clusters;

repeating the additional grouping n number of times to produce a hierarchy of n hierarchical similarity levels comprising further grouped clusters representing farther similarity distance between respective clusters in the respective similarity levels, wherein a root level comprises all the clusters; and inserting a new data point into a similarity cluster comprising insertion steps of:

determining similarity of the new data point to data points in a root level grouped cluster of the similarity tree organized dataset;

determining similarity of the new data point to data points in a first level grouped cluster within the root level of the similarity tree organized dataset;

continuing to determine similarity of the new data point to data points in grouped clusters in the hierarchical similarity levels within the first level grouped cluster until a suitable similarity cluster is detected;

add the new data point into the suitable similarity cluster.

10. The method of claim 9, wherein continuing to determine similarity of the new data point comprises creating a new suitable similarity cluster and adding of the new data point into the new suitable similarity cluster.

* * * * *